United States Patent
Hentilä et al.

[11] Patent Number: 6,044,259
[45] Date of Patent: Mar. 28, 2000

[54] SYSTEM FOR SUBSCRIBER ADMINISTRATION IN TELECOMMUNICATION NETWORK

[75] Inventors: Marko Hentilä, Espoo; Anssi Suortti, Masala, both of Finland

[73] Assignee: Telefonaktiebolaget LM Ericsson, Stockholm, Sweden

[21] Appl. No.: 08/836,371

[22] PCT Filed: Nov. 10, 1995

[86] PCT No.: PCT/FI95/00615

§ 371 Date: May 9, 1997

§ 102(e) Date: May 9, 1997

[87] PCT Pub. No.: WO96/15633

PCT Pub. Date: May 23, 1996

[30] Foreign Application Priority Data

Nov. 11, 1994 [FI] Finland ................................. 945340
Nov. 14, 1994 [FI] Finland ................................. 945368

[51] Int. Cl.⁷ ............................................. H04M 15/00
[52] U.S. Cl. ........................... 455/406; 455/435; 455/445
[58] Field of Search .................................. 455/406, 408, 455/445, 414, 435, 407; 379/112, 115

[56] References Cited

U.S. PATENT DOCUMENTS

| | | | |
|---|---|---|---|
| 5,086,457 | 2/1992 | Barraud et al. | 379/144 |
| 5,206,899 | 4/1993 | Gupta et al. | |
| 5,291,543 | 3/1994 | Freese et al. | 455/406 |
| 5,511,113 | 4/1996 | Tasaki et al. | 379/115 |
| 5,570,410 | 10/1996 | Hooshiari | 379/115 |
| 5,572,583 | 11/1996 | Wheeler, Jr. et al. | 379/112 |
| 5,581,610 | 12/1996 | Hooshiari | 379/115 |
| 5,592,535 | 1/1997 | Klotz . | |
| 5,729,597 | 3/1998 | Bhrusti | 379/115 |
| 5,796,790 | 8/1998 | Brunner | 455/406 |

FOREIGN PATENT DOCUMENTS

0 452 591 A2   10/1991   European Pat. Off. .

*Primary Examiner*—Daniel S. Hunter
*Assistant Examiner*—Thuan T. Nguyen
*Attorney, Agent, or Firm*—Burns, Doane, Swecker & Mathis, L.L.P.

[57] ABSTRACT

A system according to the invention comprises a subscriber administration logic located at a service control point SCP of an intelligent network, and a subscriber database of a service data point SDP that is associated therewith by CCS signaling. Subscriber records of the subscriber database are created, updated and deleted by the operator, but the create, read/write and delete functions can also be performed via a telephone network associated with the intelligent network. The operator can activate the control without the subscriber noticing it. For example, as a visitor subscriber of a mobile phone network is updated to a mobile phone network, the subscriber data are automatically forwarded to the intelligent network, which creates a subscriber record for the subscriber concerned. From the exchange performing call control, charging pulses generated during the call are forwarded to the service control point SCP in the manner defined by a monitoring request sent by a service control function SCF, the service control point calculating the real time charges for the call. The current charges are compared with the value indicated by the subscriber record, and the instructions contained in the record are followed. The system makes it possible to implement both call- and subscriber-specific restrictions in real time.

34 Claims, 4 Drawing Sheets

SYSTEM FOR SUBSCRIBER ADMINISTRATION IN TELECOMMUNICATION NETWORK

FIELD OF THE INVENTION

The invention relates to subscriber administration in a telephone network from which there is access to an intelligent network.

BACKGROUND OF THE INVENTION

The need to support and provide different services has led the development of telecommunication networks in the direction of what is known as an Intelligent Network IN. An intelligent network can be defined as architecture that is applicable to most telecommunication networks, irrespective of network technology. The aim is to create, control and manage teleservices giving added value. One characteristic of the intelligent network is to provide modular functions that are independent of a service used and can be connected to one another as components when new services are provided, which makes it easier to define and design new services. Another characteristic is that the supply of services is independent of the telecommunication network. The services are separate from the lowest physical network structure, whereby they may be distributed.

In recommendation CS-1 (Capability Set 1), CCITT defines an Intelligent Network Conceptual Model INCM. The model consists of four levels, each of which represents an abstract view of the possibilities offered by the intelligent network. The second highest level in the model is a Global Functional Plane, and it includes the view of the intelligent network as Service Independent Building Blocks SIB, from which desired features of a service and desired services are assembled by the use of service logic. This level also comprises a Basic Call Process BCP, which covers the whole network, and a Point of Initiation POI and a Point of Return POR between BCP and SIB.

A Service Switching Point SSP gives the user access to the network and makes all the necessary selections. It is able to detect the service requests of the intelligent network. Operationally, SSP contains call management and service selection functions. A Service Control Point SCP comprises the programs of the service logic that are used for producing intelligent network services. A Service Data Point SDP contains the data that the programs of the SCP service logic use to produce individualized services. SCP and/or SMP can use the services of SDP either directly or via a signalling network that uses an INAP protocol. Supplementary services offered by an Intelligent Peripheral IP include e.g. voice messages, synthetic voice and speech detection means, and voice generation. A Service Switching and Control Point SSCP consists of SCP and SSP in one node. A Service Management Point controls the service management, supply and performance, and can be connected to all other physical entities. Examples for the operation include database management, network control and testing, network traffic management, and network data collection. A Service Creation Environment Point SCEP is used for defining, developing and testing intelligent network services, and for supplying the service to SMP. An Adjunct AD corresponds operationally to the service control point SCP but is connected directly to SSP. A Service Node SN can control the intelligent network services, and it communicates with the users. It communicates directly with one or more SSPs. A Service Management Access Point SMAP is a physical entity that provides certain users with a connection to SMP.

A Basic Call State Model BCSM defined in connection with the intelligent network is a description of the facilities of the call management function needed for setting up and maintaining a connection between users. It detects the points (detection point) in the call and connection process in which the IN service logic entities can interact with the basic call and connection management functions. It provides a basis for describing the basic call and connection actions that may lead to activation of an IN service logic entity and description of the points where the transfer of the control may be performed.

Figure 2:
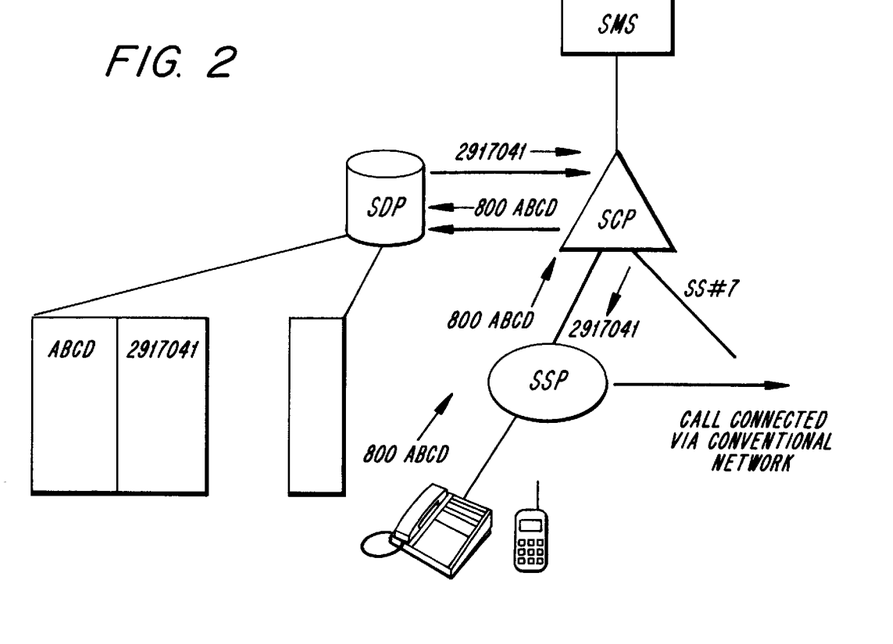
FIG. 2 illustrates a number conversion service in an intelligent network.

FIG. 2 illustrates one known basic service in an intelligent network, i.e. number conversion service. Only essential physical entities are shown in the figure. The subscriber inputs e.g. the number 800+ABCD (ABCD is a number sequence). Upon detecting the prefix 800, the call control function of the exchange identifies the call as an intelligent network call, whereby it requests for an intelligent network service via the intelligent network Service Switching Point SSP. Using common channel signalling, it sends the control point SCP an inquiry containing the number 800+ABCD. The service program of the SCP checks the SDP file to see what number of a conventional telephone network corresponds to the number 800+ABCD. In this example, the number is 291 7041. SCP sends this number to SSP, which forwards it to the call control of the exchange, which then routes the call to the number concerned. In sending the number to SSP, SCP also sends charging information on the call. The exchange generates pulses during the call, and the call is later charged for on the basis of these pulses and the charging information provided by SCP.

Another example for an intelligent network service is Automatic Alternative Billing AAB. It makes it possible for the user to make a call from any phone whatsoever, the call being later debited against the user's account, which is maintained by the operator, and the charging being implemented as aftercharging. The provider of the service allocates an Account Code to the user of the service, and a Personal Identification Number PIN. The service will be activated as the user inputs the access code, followed by the number that the user wants to call. SSP identifies the access code and transfers the control to SCP. SCP asks the user to input the account code and PIN. The code and PIN inputted by the user are checked by a database inquiry, after which the call is connected. The bill for the call is formed afterwards on the basis of the charging information provided by SCP and the pulses generated by the exchange.

Irrespective of the fact whether the subscriber uses the intelligent network service or not, and whether he is a mobile subscriber or a fixed network subscriber, it is typical of the present telephone systems that different subscriber databases are used and that call- and subscriber-specific charging is implemented as aftercharging. A fixed network typically uses the subscriber database of an exchange; and a mobile phone network, such as a GSM network, uses a Home Location Register HLR, in which permanent subscriber data are stored. The abovementioned AAB service uses a database of an intelligent network, the database containing the account number and PIN.

The feature common to all these subscriber databases is that they are created and updated by the operator of the network concerned. As known, different subscriber-specific parameters can be set in the database. For example, the network operator can set in the subscriber record a parameter that prevents the subscriber from making e.g. international calls or denies access to certain services implemented by means of an intelligent network, e.g. entertainment services. Entertainment services implemented by an intelligent network have proved particularly problematic, and so it has been possible to set a certain time limit at which the call will be terminated.

In view of the above, subscriber administration of the present networks seems to involve some problems. It is not possible to include a parameter that would prohibit overexpensive calls in the subscriber databases, since the subscriber is never charged until afterwards, after the call. The only possibility is to deny access altogether to numbers that begin with certain prefixes. Since it is not possible to receive real time information about an on-going call made by a subscriber, e.g. charging information and statistical data, the calls of a so-called problem subscriber cannot be controlled during the call. In mobile phone networks, it is at present not possible to separately control visitor subscriber traffic, but a visitor subscriber coming from another network can make phone calls and leave them unpaid, thereby making the operator suffer losses. A time limit for entertainment services, implemented in intelligent networks, is specific for the call and thereby applies to all calls to an entertainment number, so it does not prevent the subscriber from dialling service a plural number of times, since subscriber-specific or subscriber-connection-specific control has so far not been possible.

SUMMARY OF THE INVENTION

The present invention eliminates the above-identified problems by providing a system for subscriber administration in a telephone network having an exchange to which is connected a service switching point SSP of an intelligent network IN, the service switching point providing access from the telephone network to the services offered by a service control point SCP of the intelligent network. According to the invention the service data point SDP associated with the service control point SCP comprises the database of the subscribers to be managed, an individual subscriber record of the database comprising at least the A-number of the subscriber and other data on the subscriber. When the service switching point SSP has routed the call signal of a new subscriber to be managed to the intelligent network, the subscriber administration logic at the service control point SCP immediately creates in the database a subscriber record for the new subscriber. Charging pulses generated by the exchange are forwarded during the call to the service control point SCP in the manner defined by a monitoring request sent by a service control function SCF, the service control point calculating the charges for the call during the call on the basis of the charging pulses and the charging information about the call given by the service control point SCP, whereby the real time charges for the call are known.

The invention provides further a method for subscriber administration in a telephone network having an exchange to which a service switching point SSP of an intelligent network IN is connected, the service switching point providing an access from the telephone network to the services offered by a service control point SCP of the intelligent network, wherein said method comprises the steps of managing a database of the subscribers in a service data point SDP associated with the service control point SCP, an individual subscribers record of said database including at least the A-number of the subscriber and other data of the subscriber, generating charging pulses by the exchange and forwarding them during the call to the service control point SCP in a manner defined by a monitoring request sent by a service control function SCF, calculating in the service control point the charges for the call during the call on the basis of the charging pulses and the charging information about the call given by the service control point SCP, whereby the real time charges for the call become known.

The invention provides further a method for monitoring of charging of a subscriber in a telephone network, comprising the steps of forwarding a call signal of the subscriber having a certain triggering condition to an intelligent network by a service switching point SSP associated with an exchange of the network, receiving said call signal of the subscriber by a service control point SCP which subsequently checks whether subscriber's data is found in a database of a service data point SDP associated with the service control point SCP, subsequently monitoring the charging, after a speech connection has been established between subscribers, by supplying charging pulses from the exchange to the service control point SCP and cumulatively calculating the charges for the call during the call, and comparing continuously the accumulated charges with an alarm limit indicated in the database, wherein, in case the alarm limit becomes reached, some further processing will follow.

The invention provides further a method for controlling a call from a telephone capable of reaching IN services, wherein the user is provided with a personal identification and an account, said method comprising the steps of: triggering the call signal of the user to a service control point SCP of a telephone network by using a certain code as a trigger key, checking the authority of the user on the basis of the personal identification of the user and the information received by the service control point SCP, checking the current balance of the user account from the database, monitoring predetermined call parameters during the call on the basis of the information received by the service control point SCP.

The system comprises specific subscriber administration logic provided at the service control point SCP of the intelligent network. The database is physically located at the service data point SDP. Subscriber records of the subscriber database are created and deleted by the operator via a service management system SMS, but according to one characteristic of the invention, subscriber records are also created and deleted via a telephone network associated with the intelligent network. The create, read/write and delete functions conducted via the telephone network are automatic. For example, when a visitor subscriber of a mobile phone network is updated to a mobile phone network, the subscriber data are automatically forwarded to the intelligent network, which creates a subscriber record for the subscriber concerned. According to another characteristic of the invention, charging pulses generated during the call are transmitted from the exchange performing call control to a service control exchange in the manner defined by a monitoring request sent by a Service Control Function SCF, the latter exchange indicating the current, real-time charges for the call. The current charges are compared with the value given in the subscriber record, and the instructions provided by the record are followed.

BRIEF DESCRIPTION OF THE DRAWINGS

In the following, the invention will be described in greater detail with reference to the attached schematic drawings, in which.

DETAILED DESCRIPTION OF INVENTION

Figure 1:
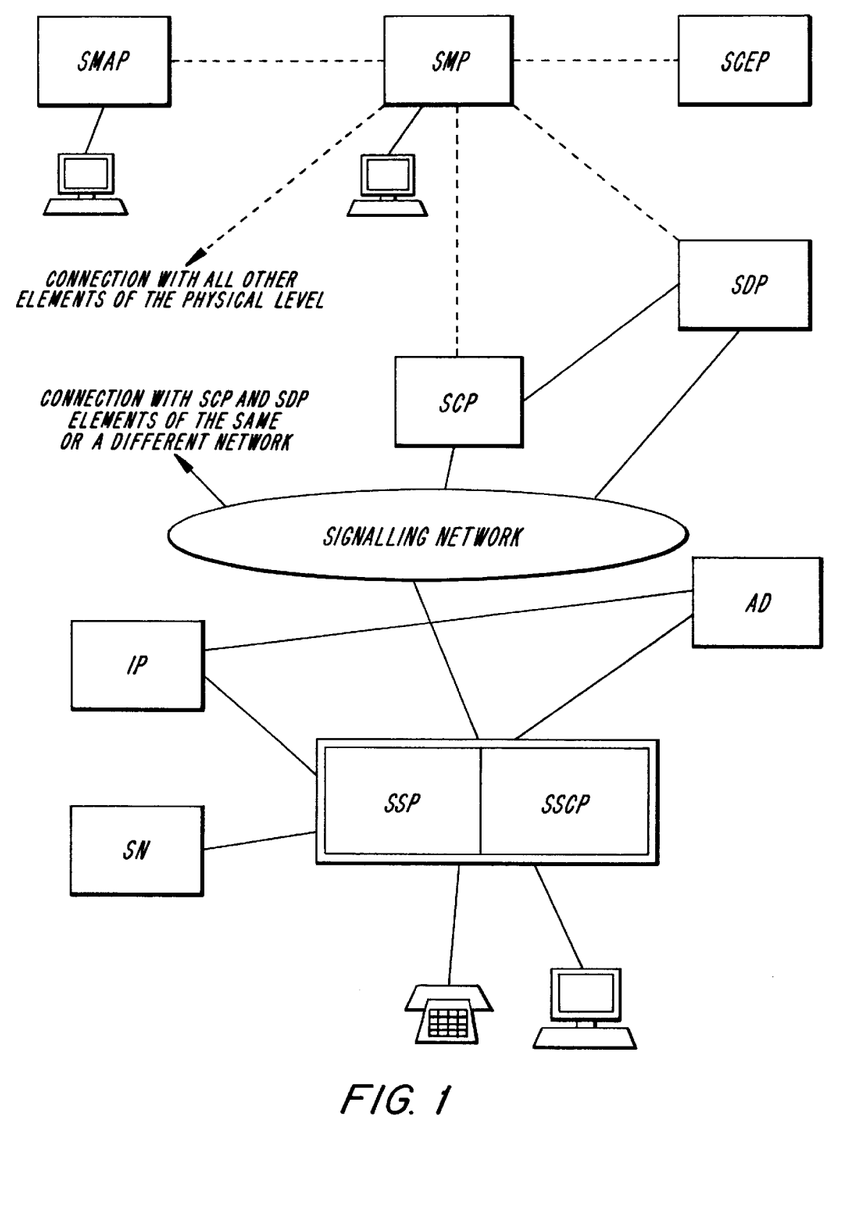
FIG. 1 shows physical architecture of an intelligent network.

The physical architecture of the intelligent network is shown in FIG. 1. A Service Switching Point SSP gives the user access to the network and makes all the necessary selections. It is able to detect the service requests of the intelligent network. Operationally, SSP contains call management and service selection functions. A Service Control Point SCP comprises the programs of the service logic that are used for producing intelligent network services. A Service Data Point SDP contains the data that the programs of the SCP service logic use to produce individualized services. SCP and/or SMP can use the services of SDP either directly or via a signalling network that uses an INAP protocol. Supplementary services offered by an Intelligent Peripheral IP include e.g. voice messages, synthetic voice and speech detection means, and voice generation. A Service Switching and Control Point SSCP consists of SCP and SSP in one node. A Service Management Point controls the service management, supply and performance, and can be connected to all other physical entities. Examples for the operation include database management, network control and testing, network traffic management, and network data collection. A Service Creation Environment Point SCEP is used for defining, developing and testing intelligent network services, and for supplying the service to SMP. An Adjunct AD corresponds operationally to the service control point SCP but is connected directly to SSP. A Service Node SN can control the intelligent network services, and it communicates with the users. It communicates directly with one or more SSPs. A Service Management Access Point SMAP is a physical entity that provides certain users with a connection to SMP.

A Basic Call State Model BCSM defined in connection with the intelligent network is a description of the facilities of the call management function needed for setting up and maintaining a connection between users. It detects the points (detection point) in the call and connection process in which the IN service logic entities can interact with the basic call and connection management functions. It provides a basis for describing the basic call and connection actions that may lead to activation of an IN service logic entity and description of the points where the transfer of the control may be performed. FIG. 2 illustrates one known basic service in an intelligent network, i.e. number conversion service. Only essential physical entities are shown in the figure. The subscriber inputs e.g. the number 800+ABCD (ABCD is a number sequence). Upon detecting the prefix 800, the call control function of the exchange identifies the call as an intelligent network call, whereby it requests for an intelligent network service via the intelligent network Service Switching Point SSP. Using common channel signalling, it sends the control point SCP an inquiry containing the number 800+ABCD. The service program of the SCP checks the SDP file to see what number of a conventional telephone network corresponds to the number 800+ABCD. In this example, the number is 291 7041. SCP sends this number to SSP, which forwards it to the call control of the exchange, which then routes the call to the number concerned. In sending the number to SSP, SCP also sends charging information on the call. The exchange generates pulses during the call, and the call is later charged for on the basis of these pulses and the charging information provided by SCP.

Another example for an intelligent network service is Automatic Alternative Billing AAB. It makes it possible for the user to make a call from any phone whatsoever, the call being later debited against the user's account, which is maintained by the operator, and the charging being implemented as after-charging. The provider of the service allocates an Account Code to the user of the service, and a Personal Identification Number PIN. The service will be activated as the user inputs the access code, followed by the number that the user wants to call. SSP identifies the access code and transfers the control to SCP. SCP asks the user to input the account code and PIN. The code and PIN inputted by the user are checked by a database inquiry, after which the call is connected. The bill for the call is formed afterwards on the basis of the charging information provided by SCP and the pulses generated by the exchange and indicating the duration of the call.

Figure 3:
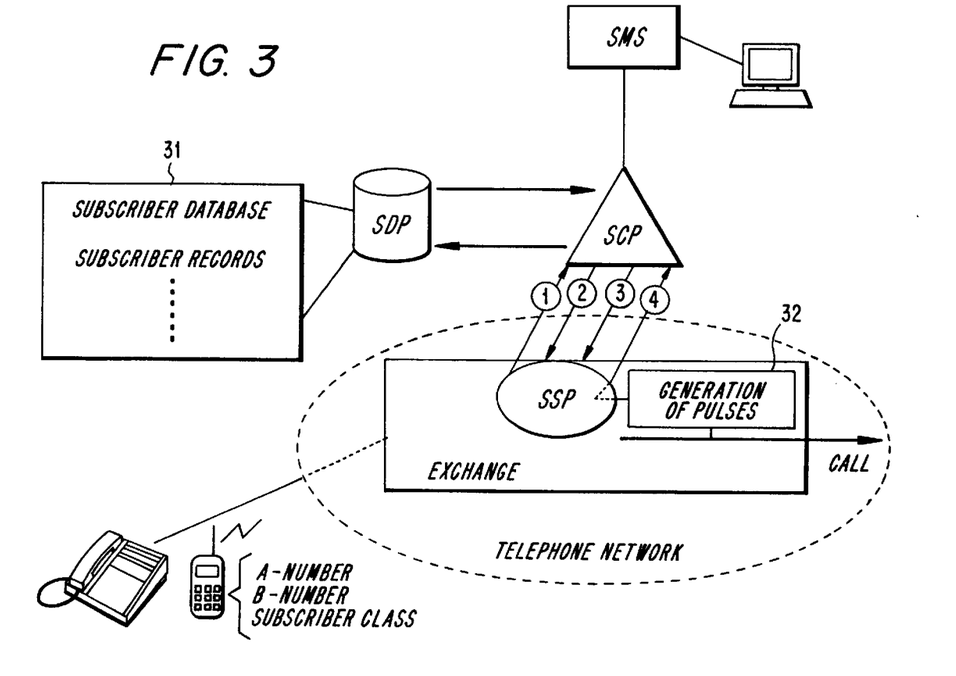
FIG. 3 shows an intelligent network supplemented with a system according to the invention.

The broken line in FIG. 3 defines a telecommunication network comprising an exchange. A telecommunication network may be a fixed network or a mobile phone network. To a digital exchange is connected a service switching point SSP of the intelligent network, the point detecting the requests of the intelligent network service. Operationally, SSP corresponds to a Service Switching Function SSF, which connects a Call Control Function CCF and the service control function SCF. It allows SCF to control CCF. The basis for a service request may be the number of a B-subscriber dialled by an A-subscriber, who may be a fixed network subscriber or a mobile subscriber, or the number or subscriber class of the A-subscriber. On the basis of the number of the B-subscriber, e.g. an international call can be controlled in the intelligent network in the manner described in the invention. On the basis of the number of the A-subscriber, it is possible to detect e.g. a foreign subscriber visiting a GSM mobile phone network. When the Mobile Station International ISDN (MSISDN) number of the subscriber shows that the subscriber is a visitor, all his calls are controlled by the intelligent network service. When the subscriber class indicator shows that the subscriber uses an intelligent network service, e.g. an entertainment number beginning with 700, call control is also transferred to the intelligent network. On the basis of the subscriber class, all calls of any given group can be subjected to the control of the intelligent network, e.g. all GSM subscribers, NMT subscribers, VPN connections (Virtual Private Network), etc.

At the service control point SCP of the intelligent network, physically at the service data point SDP, there is a database 31 comprising subscriber-specific information in an individual subscriber record. The record thus contains at least the A-number and information on the balance. In addition to these, the record may comprise e.g. black/white information, the abbreviated number of the subscriber, statistical data, and instructions. The statistical data may indicate the number of calls made by the subscriber, the number he has dialled, call durations, etc. The instructions indicate how to perform when certain conditions are met. Such a condition may be e.g. that predetermined charges are exceeded. The basic database is created by the operator via the service management system SMS. According to the invention, records can also be created and deleted automatically by the telecommunication network. For example, when a visiting mobile subscriber updates location data in the network, SSP identifies him by the MSISDN number as a visitor and forwards the number to SCP, which immediately creates a separate record for the visitor number and sets the fields containing desired information therein. After this, all calls of a visiting GSM-subscriber are controlled by SCP.

When a subscriber whose calls are to be controlled dials a number, the A-number of the subscriber is forwarded to the intelligent network, and so is the B-number, at least when it is subjected to number conversion in the intelligent network (cf. FIG. 2). This is indicated by the arrow marked with a circled one. If the call uses an intelligent network service, e.g. an entertainment service, SCP sends the exchange routing instructions and charging information. The former is indicated by an arrow marked with a circled two, and the latter by an arrow marked with a circled three. When the call has been routed to a B-subscriber and a speech connection is established, pulses are generated in a pulse generator 32. In prior art systems, the exchange calculates the charges of the call afterwards on the basis of the charging information and the pulses generated during the call. In a system of the invention, charging pulses generated during the call are forwarded to the service control point SCP in the manner defined by a monitoring request sent by a service control function SCF. The monitoring requests are responded to by the service switching function SSF. This is indicated by an arrow marked with a circled four. On the basis of the pulses and the charging information, SCP calculates the charges for the call in real time as the call progresses. SCP has fetched the subscriber data from the database of the subscriber record of the A-subscriber, and if the data includes information about the charges of the call, e.g. the maximum charges allowed, the call will be disconnected accordingly, or another procedure will be followed. This other procedure is also indicated in the record. The record may give instructions to send the subscriber a voice message indicating e.g. that the call will be disconnected in a moment or that the upper limit set for the charges has been reached.

The subscriber record may comprise subscriber data or conditions relating to them. If, for example, SCP detects that the subscriber attempts to call a certain number more often than allowed, the call will not be connected, and the subscriber will be notified accordingly.

Figure 4:
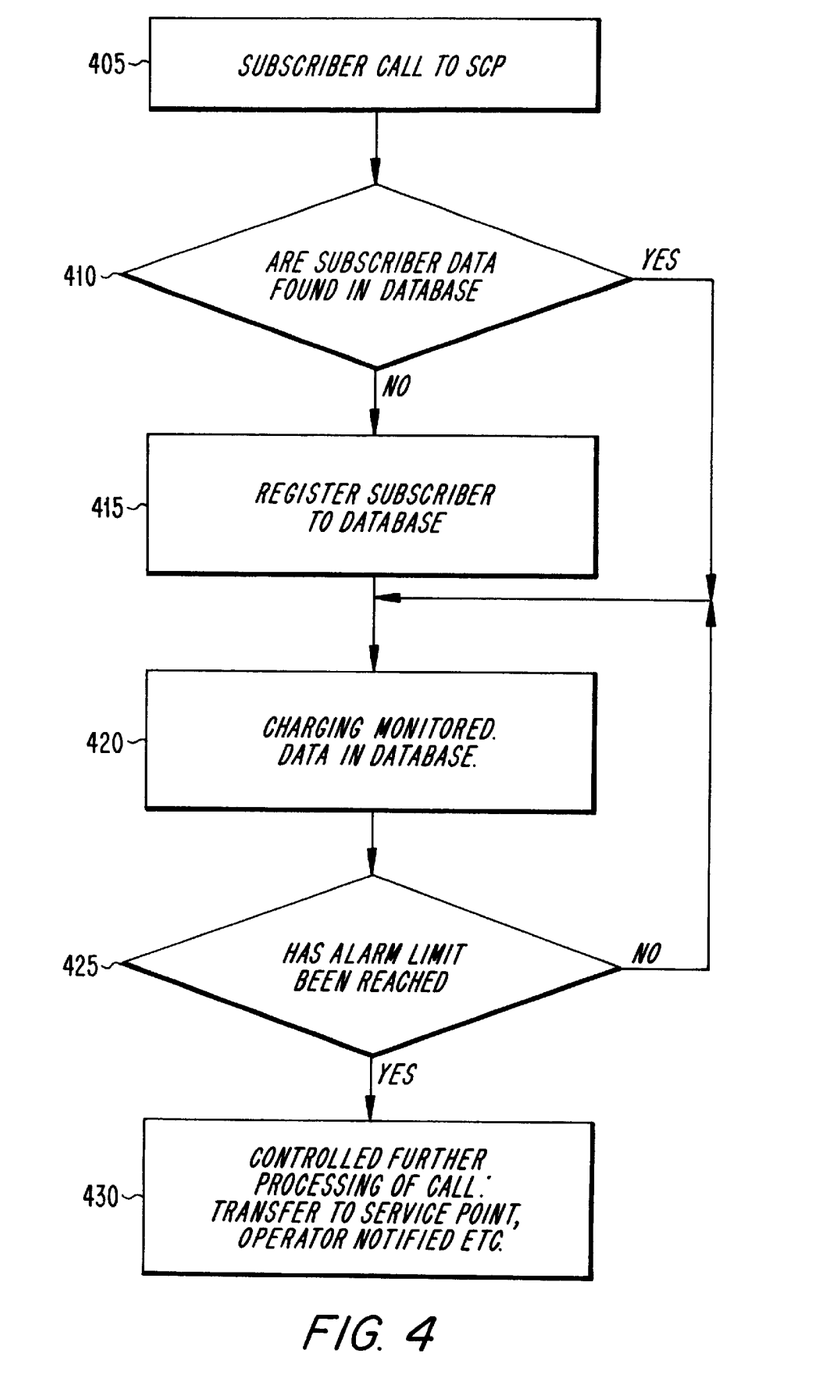
FIG. 4 is a flow diagram of how subscriber charging is monitored.

FIG. 4 is a flow diagram therein showing how charging is monitored. At first, as a certain trigger condition is met and the subscriber's call signal is forwarded to the intelligent network by the service switching point SSP associated with the exchange as indicated in block 405. Different trigger conditions have been described above. Upon receiving the subscriber's call signal, the SCP checks whether the subscriber's data are found in the database 31 (FIG. 3) as illustrated in decision block 410. If they are not found in accordance with the "NO" path out of decision block 410, the SCP registers the subscriber by creating a separate subscriber record for it and inputs the A-number of the subscriber in the record as indicated by block 415. After this, when a speech connection has been established between the subscribers, charging pulses are supplied from the exchange to the SCP. It calculates the charges for the call cumulatively during the call as illustrated in block 420, and the compares the accumulated charges with the alarm limit indicated in the database as illustrated by decision block 425. When the alarm limit is reached as indicated by the "YES" path out of decision block 425, managed further processing follows as indicated by block 430. The instructions for the further processing may be general or specific for the subscriber. In the latter situation, the instructions are included in the subscriber record. According to them, the operator can be instructed to transfer the call to SSP, which notifies the subscriber that the call is about to be disconnected, or the instructions may also indicate some other desired function.

Figure 5:
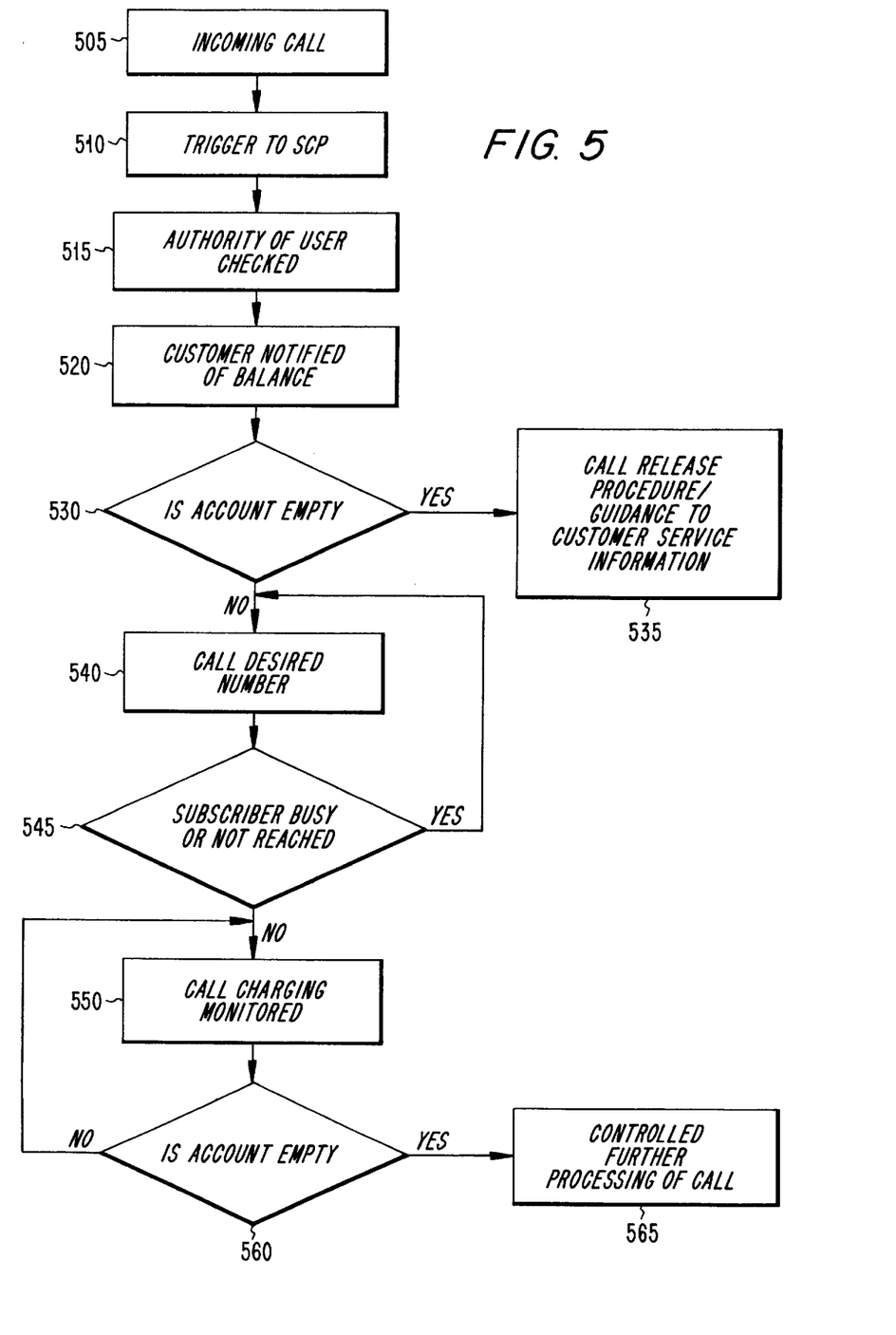
FIG. 5 is a flow diagram showing transactions when a call is made using a prepaid card.

FIG. 5 shows how the method of the invention can be applied to controlling calls that are paid with a prepaid card. This makes it possible for the user to call from any phone whatsoever, and yet the call will be charged against the user's account, which has a certain pre-set balance. The user of a service has an Account Code and a Personal Identification Number PIN. The incoming call signal of the subscriber illustrated by block 505 is triggered to the SCP using an account code, A-number or B-number as a trigger key. The authority is checked as indicated by block 515 on the basis of the A-number, mobile phone number MSISDN or personal identification number PIN of the subscriber, or on the basis of something else. SCP checks the subscriber database to see the current balance of the subscriber and notifies the subscriber by a voice message or on the display of the subscriber station. If the account is empty, in accordance with the "YES" path out decision block 530, the call procedure is released, and as indicated by block 535, if the balance is positive, as indicated by the "NO" path out of decision block 530, the call is connected. If a subscriber replies, as indicated by the "NO" path out of decision block 545, charging is started on the basis of the charging information and the pulses received from the exchange as indicated by block 550. In addition, the call can be monitored in respect of other conditions indicated in the subscriber record. At the end of the call, the subscriber's account shows the real time balance, and if the account is empty, as indicated by the "YES" path out of decision block 560, the desired further processing follows as illustrated by decision block 425. The instructions for this can also be included in the subscriber database.

The system of the invention allows many different applications. It can be used for controlling pre-paid calls possibly involving restrictions or other services. Call-specifically, it is also possible to restrict the duration of one call on the basis of the charges, and subscriber-specific call control is easy to implement. For example, the total number of calls that a subscriber can make can be restricted. The subscriber can be registered automatically by the telecommunication network to the subscriber database, and this can be implemented without that the subscriber notices it. For example, GSM visitor subscriber traffic can be controlled thereby, and so visiting subscribers cannot incur bad debts to the operator. Calls of socalled problem subscribers are easy to control, and real time information can be obtained easily on them, so necessary steps can be taken in time in respect of the subscriber concerned.

The above description and the accompanying figures are only intended to illustrate the present invention. It is obvious to one skilled in the art that the invention can be varied and modified in many ways without deviating from the scope and spirit of the invention disclosed in the attached claims.

What is claimed is:

1. A system for subscriber administration in a mobile telephone network having an exchange to which is connected a service switching point SSP of an intelligent network IN, the service switching point providing access from the mobile telephone network to a number of services offered by a service control point SCP of the intelligent network, said system comprising:

a service data point SDP associated with the service control point SCP, wherein said service data point SDP comprises a database of subscribers to be managed, and an individual subscriber record which includes at least an A-number of the subscriber;

subscriber administration logic associated with the service control point SCP, wherein said subscriber administration logic immediately creates in the database a subscriber record for a new subscriber, when the service switching point SSP has routed the call signal of a new subscriber to be managed to the intelligent network, wherein the subscriber record contains additional data including information regarding an account balance, set for the subscriber by an operator;

means for forwarding charging pulses, generated by the exchange during the call, to the service control point SCP in a manner defined by a monitoring request sent by a service control function SCF, the service control point calculating the charges for the call during the call on the basis of the charging pulses and the charging information about the call given by the service control point SCP, whereby real time charges for the call are known; and means for reducing the account balance in real time in accordance with charges incurred during the call only when a speech connection is established with a predetermined B-subscriber number as indicated in the subscriber record.

2. A system according to claim 1, wherein the new subscriber to be managed is a mobile subscriber visiting the mobile telephone network, and wherein said system further comprises:

means for creating a second subscriber record for the visiting subscriber in connection with location updating, and wherein the service control point SCP comprises means for controlling all the calls of the visiting mobile subscriber with the help of information contained in the second subscriber record.

3. A system according to claim 1, wherein the account balance is set by the operator for one call made by the subscriber, and wherein said system further comprises:

means for releasing the speech connection in a controlled manner as the account balance reaches zero.

4. A system according to claim 1, the subscriber record contains additional data including information regarding an allowed number of calls, set by the operator for one subscriber, and wherein said system further comprises:

means for preventing a speech connection from becoming established if the number of calls exceeds the allowed number.

5. A system according to claim 4, wherein the allowed number is applied only when a speech connection is established to a predetermined B-subscriber number, as indicated in the subscriber record.

6. A system according to claim 4, wherein said system further comprises:

means for sending the calling subscriber, and optionally the called subscriber, a voice message, when the account balance reaches zero or the number of calls exceeds the allowed number.

7. A system according to claim 1, wherein the subscriber record contains additional data including statistical data regarding subscriber calls, and wherein the operator is able to use these data to control and manage the calls of the subscriber.

8. A system according to claim 1, wherein said system further comprises:

means for allowing the subscriber to place a call to a common call number, input identification data, and be informed of the current account balance, and means for reducing the account balance in real time, when the subscriber inputs the number of a B-subscriber and the speech connection has been established, wherein the subscriber can call from any subscriber connection whatsoever without the connection concerned being charged.

9. A method for subscriber administration in a mobile telephone network having an exchange to which a service switching point SSP of an intelligent network IN is connected, the service switching point providing an access from the mobile telephone network to the services offered by a service control point SCP of the intelligent network, wherein said method comprises the steps of:

managing a database of subscribers, in a service data point SDP associated with the service control point SCP, and an individual subscriber record of said database including at least an A-number of the subscriber, wherein the subscriber record contains additional data including information regarding an account balance set by an operator;

generating charging pulses, and forwarding them from the exchange to the service data point SCP during the call in a manner defined by a monitoring request sent by a service control function SCF;

during the call, calculating charges for the call based on the charging pulses and charging information about the call provided by the service control point SCP, wherein the real time charges for the call become known; and reducing the account balance in real time according to the charges incurred during the call only when the call is established with a predetermined B-subscriber number as indicated in the subscriber record.

10. A method according to claim 9 further comprising the step of:

in case of a new subscriber, routing a call signal to the intelligent network; and immediately creating thereafter, in the database, a subscriber record for said new subscriber.

11. A method according to claim 10, wherein the new subscriber is a mobile subscriber visiting the mobile phone network, and wherein said method further comprises the steps of:

creating a second subscriber record for the visiting mobile subscriber in connection with location updating; and controlling all of the calls of the visiting mobile subscriber with the help of information contained in the second subscriber record.

12. A method according to claim 9 further comprising the steps of:

providing the subscriber with current account balance information when the subscriber calls a common call number and inputs identification data; and upon the subscriber inputting the predetermined B-subscriber number, and upon establishing a speech connection, reducing the account balance in real time, wherein the subscriber can call from any subscriber connection without that connection being charged.

13. A method according to claim 9, wherein the subscriber record contains additional information regarding an allowed number of calls, as set by the operator for one subscriber, and wherein said method further comprises the step of:

preventing a speech connection from being established if a number of calls placed by the one subscriber exceeds the allowed number of calls.

14. A method according to claim 13 further comprising the step of:

applying the allowed number of calls only when a speech connection is established to a predetermined B-subscriber number, as indicated in the subscriber record.

15. A method according to claim 13 further comprising the step of:

sending a calling subscriber, and optionally a called subscriber, a voice message when the account balance reaches zero or the number of calls exceeds the allowed number of calls.

16. A method according to claim 9 further comprising the step of:

releasing the speech connection in a controlled manner as the account balance reaches zero.

17. A method according to claim 16 further comprising the step of:

sending a calling subscriber, and optionally a called subscriber, a voice message when the account balance reaches zero or the number of calls exceeds the allowed number of calls.

18. A method according to claim 9, wherein the subscriber record contains additional data including statistical data regarding the calls placed by the subscriber, and wherein the operator is able to use these data to control and manage the calls of the subscriber.

19. A method for monitoring subscriber charges in a telephone network, comprising the steps of:

forwarding a subscriber call signal to an intelligent network by a service switching point SSP associated with an exchange of the network, wherein said subscriber call signal is associated with a triggering condition;

receiving the subscriber call signal by a service control point SCP, which subsequently checks whether subscriber data is found in a database in a service data point SDP associated with the service control point SCP;

monitoring the subscriber charges, after a speech connection has been established with a predefined B subscriber as defined by the subscriber data, by supplying charging pulses from the exchange to the service control point SCP and cumulatively calculating the charges for the call during the call; and continuously comparing accumulated charges with an alarm limit, as indicated in the database.

20. A method according to claim 19 further comprising the step of:

registering the subscriber by creating a new subscriber record in the database, if subscriber data is not found in the database; and inputting an A-number for the subscriber in the subscriber record.

21. A method according to claim 19, wherein said method further comprises the step of:

providing additional processing is accordance with instructions which are subscriber specific, if the alarm limit is reached; said instruction being included in the subscriber record.

22. A method according to claim 19, wherein said method further comprises the step of:

providing additional processing in accordance with instructions which are general for all subscribers, if the alarm limit is reached.

23. A method for controlling a call from a telephone capable of reaching IN services, wherein a user is provided with a personal identification and an account, said method comprising the steps of:

triggering a call signal of the user to a service control point SCP of a telephone network by using a certain code as a trigger key;

checking user authority based on a personal identification code of the user and the information received by the service control point SCP;

checking the user's current account balance from a database; and monitoring predetermined call parameters during the call based on information received by the service control point SCP.

24. A method according to claim 23 further comprising the step of:

releasing the call if the account is empty.

25. A method according to claim 24 further comprising the step of:

notifying the user about the account balance, preferably by a voice message or on a display of the user station.

26. A method according to claim 23 further comprising the step of:

notifying the user about the account balance, preferably by a voice message or on a display of the user station.

27. A method according to claim 23 further comprising the step of:

connecting the call to a desired number if the account balance is positive.

28. A method according to claim 23 further comprising the step of:

monitoring charges for the call based on charging information and charging pulses, until the call is ended or until the account is empty.

29. A method according to claim 23, wherein the personal identification is selected from a group comprising an A-number, a mobile number, and a personal identification number PIN.

30. A method according to claim 23, wherein said certain code is selected from a group comprising an account code, an A-number or a B-number of the user.

31. A system for subscriber administration in a mobile telephone network having an exchange to which is connected a service switching point SSP of an intelligent network IN, the service switching point providing access from the mobile telephone network to a number of services offered by a service control point SCP of the intelligent network, said system comprising:

a service data point SDP associated with the service control point SCP, wherein said service data point SDP comprises a database of subscribers to be managed, and an individual subscriber record which includes at least an A-number of the subscriber; and subscriber administration logic associated with the service control point SCP, wherein said subscriber administration logic immediately creates in the database a subscriber record for a new subscriber, when the service switching point SSP has routed the call signal of a new subscriber to be managed to the intelligent network, and wherein the subscriber record contains additional data including statistical data regarding subscriber calls, the operator being able to use this data to control and manage the calls of the subscriber.

32. A system according to claim 31, wherein the subscriber record contains additional data including information regarding an allowed number of calls, set by the operator for one subscriber, and wherein said system further comprises:

means for preventing a speech connection from becoming established if the number of calls exceeds the allowed number.

33. A system according to claim 32, wherein the allowed number is applied only when a speech connection is established to a predetermined B-subscriber number, as indicated in the subscriber record.

34. A system according to claim 32, wherein said system further comprises:

means for sending the calling subscriber, and optionally the called subscriber, a voice message when the number of calls exceeds the allowed number.

* * * * *